US007451688B2

(12) United States Patent
Takahashi et al.

(10) Patent No.: US 7,451,688 B2
(45) Date of Patent: Nov. 18, 2008

(54) LOCK MECHANISM FOR USE WITH FLUID PRESSURE-OPERATED APPARATUS

(75) Inventors: Kazuyoshi Takahashi, Koto-ku (JP); Atsushi Tamai, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 136 days.

(21) Appl. No.: 11/475,097

(22) Filed: Jun. 27, 2006

(65) Prior Publication Data

US 2007/0062368 A1 Mar. 22, 2007

(30) Foreign Application Priority Data

Jul. 7, 2005 (JP) .............................. 2005-199421

(51) Int. Cl.
*F16H 39/00* (2006.01)
*F15B 15/00* (2006.01)

(52) U.S. Cl. .................................... 92/17; 92/14; 92/20

(58) Field of Classification Search ....................... 92/1, 92/17, 20, 26, 24

See application file for complete search history.

(56) References Cited

U.S. PATENT DOCUMENTS 3,397,620 A * 8/1968 Skelton et al. ................. 92/24
3,889,576 A * 6/1975 Sheffer et al. ................. 92/24
4,524,676 A * 6/1985 Rogers .......................... 92/24
4,635,536 A * 1/1987 Liu et al. ....................... 92/24
4,784,037 A * 11/1988 Fabyan et al. ................. 92/27
6,832,539 B2 * 12/2004 Colby .......................... 92/20

FOREIGN PATENT DOCUMENTS

DE 29 11 071 9/1980
DE 299 20 639 U1 5/2000
JP 06-323307 11/1994

* cited by examiner

*Primary Examiner*—Thomas E Lazo
(74) *Attorney, Agent, or Firm*—Paul A. Guss

(57) ABSTRACT

A lock mechanism is provided in a head cover of a cylinder tube. The lock mechanism comprises a holder, which is installed in the head cover, a plurality of balls that are retained displaceably in a radial direction with respect to the holder, and a displacement member that displaces the balls under a resilient action of an elastic member. The balls engage with a ball groove of a lock pin. The balls are retained by a resilient force of the elastic member, in order to restrict displacement of the lock pin.

13 Claims, 5 Drawing Sheets

LOCK MECHANISM FOR USE WITH FLUID PRESSURE-OPERATED APPARATUS

BACKGROUND OF THE INVENTION

1. Field of the Invention

The present invention relates to a lock mechanism, which is used with a fluid pressure-operated apparatus that is driven by a pressure fluid. In particular, the present invention relates to a lock mechanism used with a fluid pressure-operated apparatus, which is capable of restricting displacement of a piston in a cylinder body.

2. Description of the Related Art

A pressure fluid-operated apparatus (for example, a cylinder apparatus), which is driven by a pressure fluid, has hitherto been used as a driving mechanism for transporting and positioning a workpiece, or as a driving mechanism for driving various types of industrial machinery.

For example, the cylinder apparatus, which as described above functions as a fluid pressure-operated apparatus, has a piston that is displaceable in an axial direction of a cylinder body having a cylindrical shape. When a pressure fluid is supplied from a supply port to a cylinder chamber, which is formed between the cylinder body and the piston, the piston is displaced along the cylinder body under a pressing action of the pressure fluid. The aforementioned cylinder apparatus occasionally is provided with a lock mechanism that restricts displacement of the piston so that a workpiece transported by the cylinder apparatus may be retained at a desired position.

The lock mechanism includes a retaining section, which protrudes at one end of the piston. A cylindrical buffer is installed in a hole disposed at an end of the cylinder body that is opposed to the retaining section. When the piston is displaced, the retaining section is inserted into the buffer, whereby a retaining operation is effected as a result of contact between the retaining section and the buffer. Accordingly, the retaining section is retained by the buffer, thereby providing a locked state in which displacement of the piston provided with the retaining section is restricted (see, for example, German Utility Model No. 29920639).

In the conventional technique described above, the buffer, which constitutes the lock mechanism, is formed of an elastic material that expands diametrally in order to retain the retaining section. Therefore, when the lock mechanism is used over several years, abrasions, permanent set in fatigue and/or settling may arise in the buffer due to contact action between the retaining section and the buffer. Further, the retaining force exerted on the retaining section by the buffer may be lowered. As a result, it may become difficult to reliably restrict displacement of the piston. Further, the retaining force exerted on the retaining section by the buffer in the lock mechanism, and the retaining state for restricting displacement of the piston, tend to become unstable.

SUMMARY OF THE INVENTION

A general object of the present invention is to provide a lock mechanism, which makes it possible to reliably and stably restrict displacement of a piston while also improving durability of the lock mechanism.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
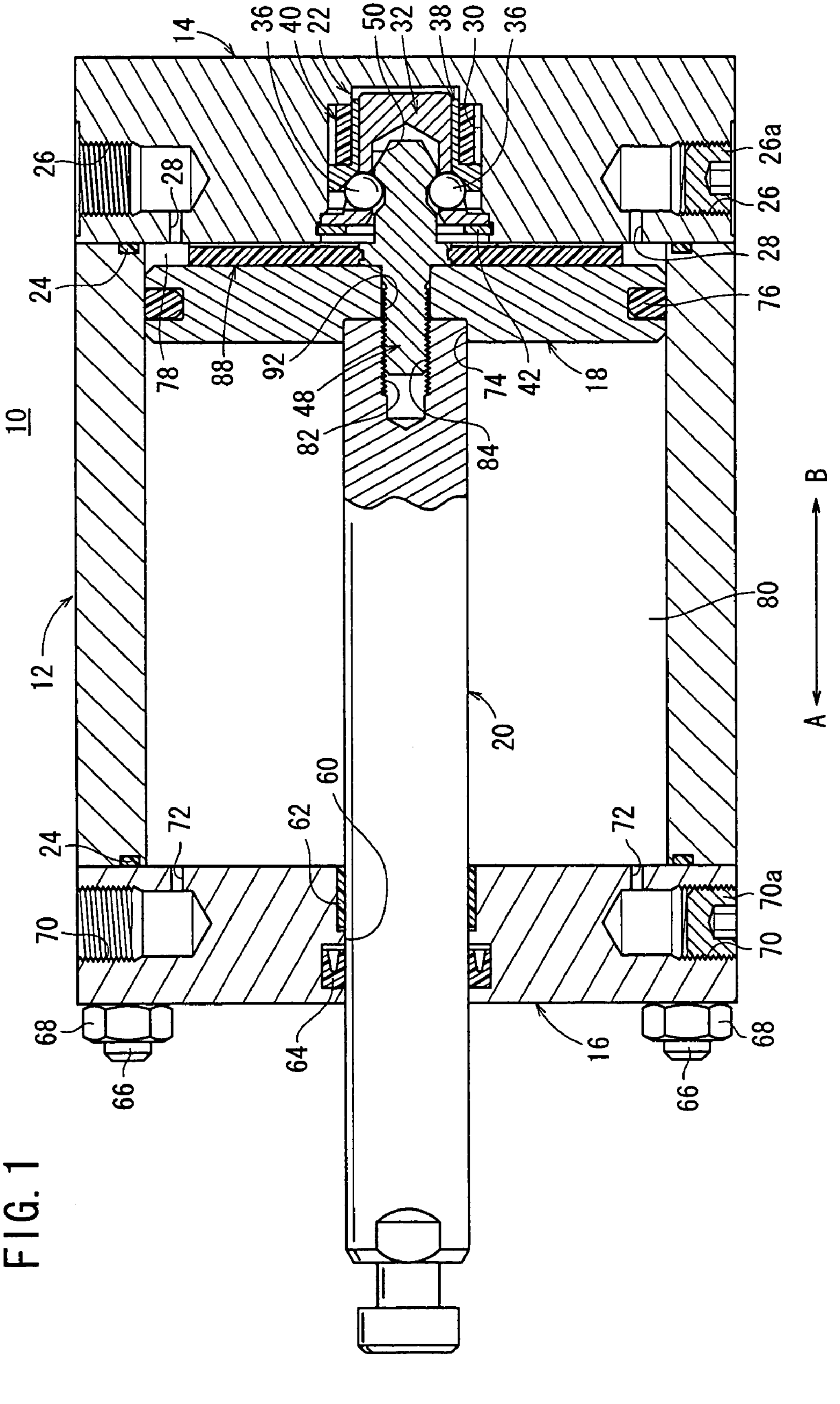
FIG. 1 is a longitudinal sectional view illustrating a cylinder apparatus incorporating a lock mechanism according to an embodiment of the present invention.

With reference to FIG. 1, reference numeral 10 indicates a cylinder apparatus incorporating a lock mechanism according to an embodiment of the present invention.

As shown in FIG. 1, the cylinder apparatus 10 comprises a cylinder tube (cylinder body) 12 having a cylindrical shape, a head cover (cylinder body) 14 secured to one end of the cylinder tube 12, and a rod cover 16 secured to the other end of the cylinder tube 12. The cylinder apparatus 10 further comprises a piston 18, which is displaceable in an axial direction in the cylinder tube 12, a piston rod 20 connected to the piston 18, and a lock mechanism 22, which is disposed in the head cover 14 and which restricts displacement of the piston 18 and the piston rod 20.

Seal members 24 are installed in annular grooves in both end surfaces of the cylinder tube. The seal members 24 abut against end surfaces of the rod cover 16 and the head cover 14, which are secured to the cylinder tube 12, thereby retaining air-tightness in the cylinder tube 12.

First ports (supply ports) 26, to which pressure fluid is supplied from an unillustrated pressure fluid supply source, are formed in the head cover 14. The first pair of ports 26 is provided on both side surfaces symmetrically in relation to the center axis of the head cover 14. The first ports 26 communicate with the interior of the cylinder tube 12 via first communication passages 28, which extend from bottom portions of the first ports 26 in an axial direction (direction of arrows A and B) of the head cover 14. Either one of the pair of first ports 26 may be selected and used depending on, for example, the manner and environment of use of the cylinder apparatus 10, whereas the other first port 26 is closed by a plug 26*a*.

An installation hole 30, which opens toward the cylinder tube 12 (in the direction of arrow A), is formed at a substantially central portion of the head cover 14. The lock mechanism 22 is installed in the installation hole 30. The lock mechanism 22 is accommodated within the installation hole 30 in such a way that the lock mechanism 22 does not protrude from the end surface of the head cover 14.

Figure 2:
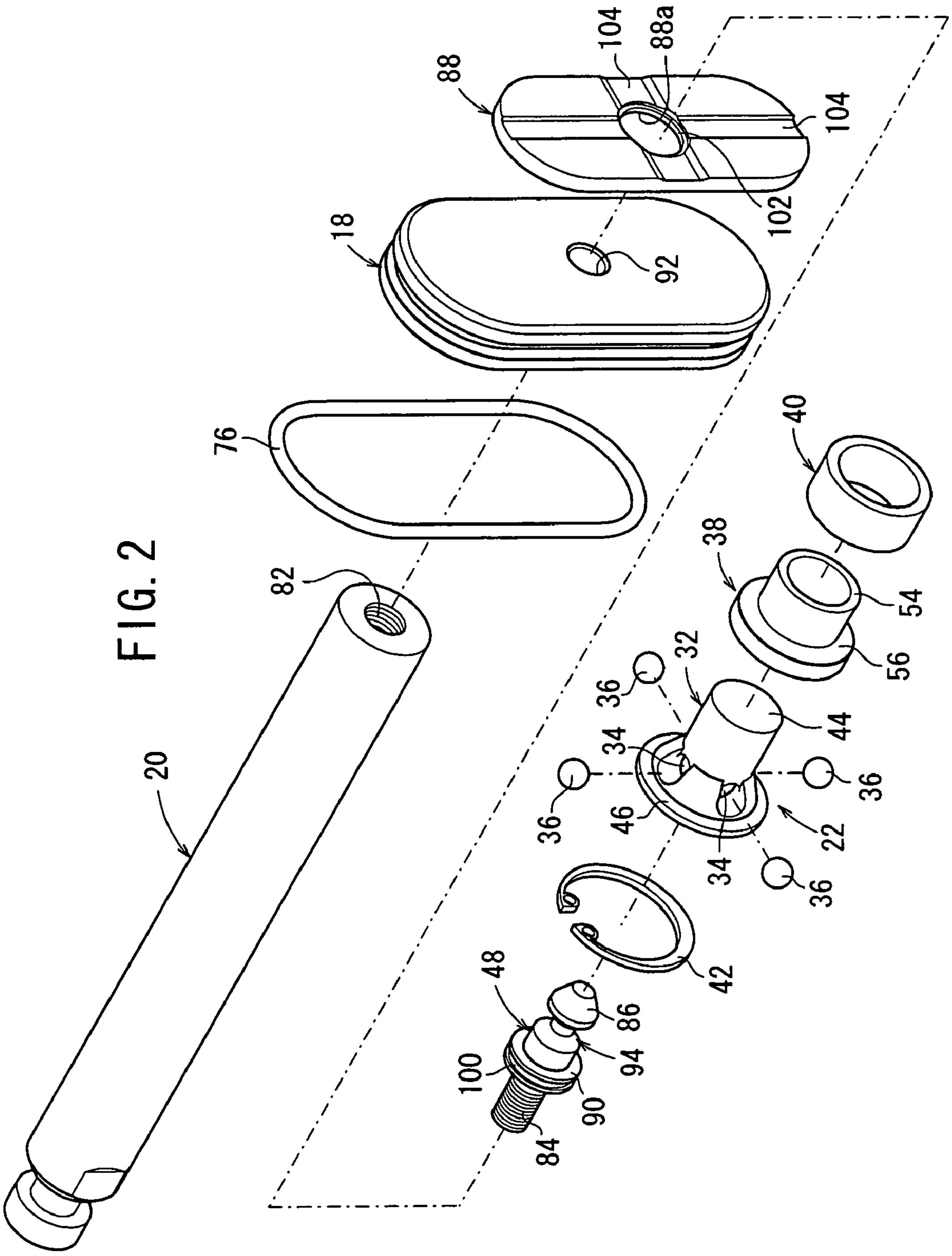
FIG. 2 is, with partial omission, an exploded perspective view illustrating a disassembled state of a piston, a piston rod, and the lock mechanism making up the cylinder apparatus shown in FIG. 1.
Figure 3:
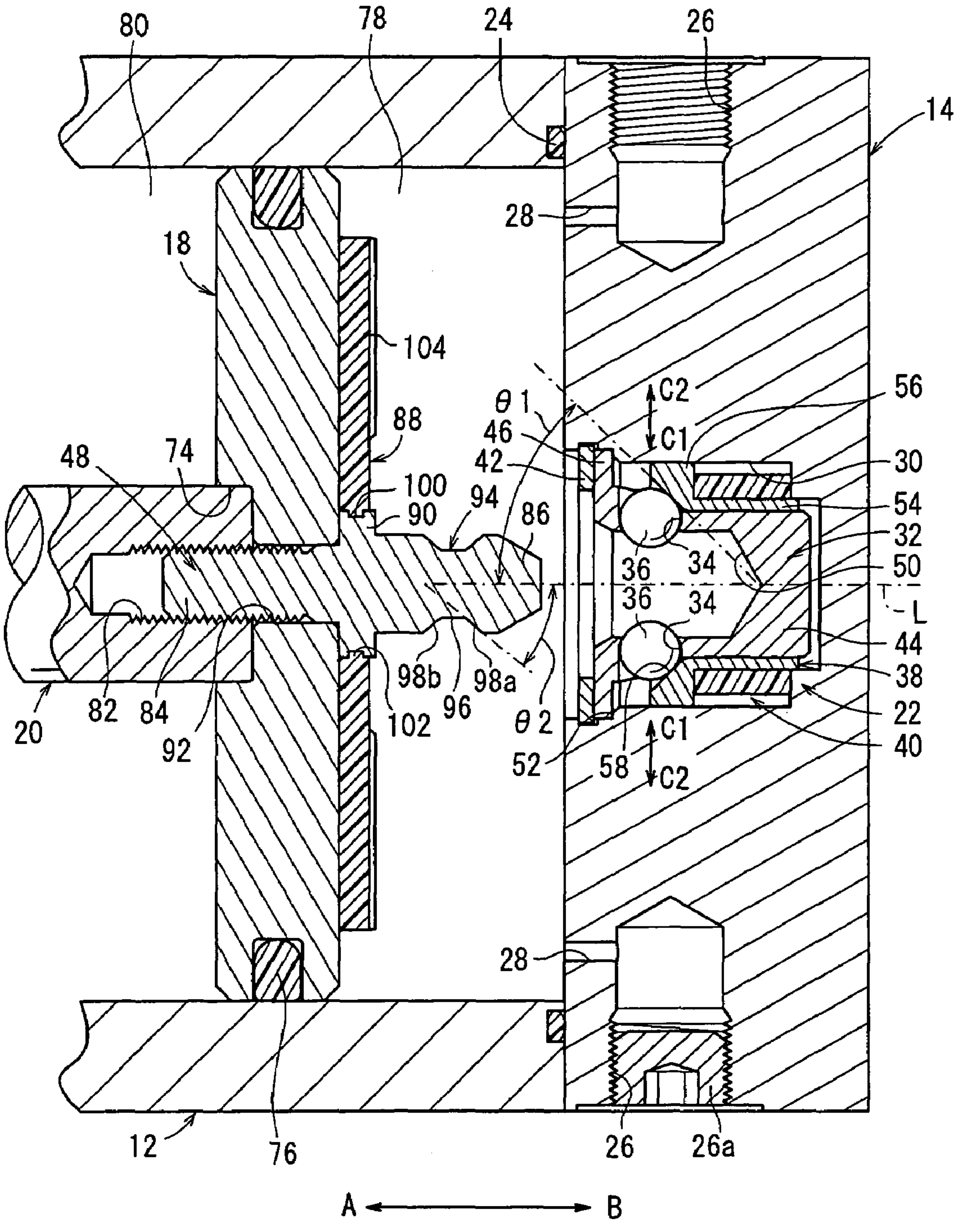
FIG. 3 is a magnified longitudinal sectional view illustrating an unlocked state, in which the piston rod is released from locking by the lock mechanism, in relation to the cylinder apparatus shown in FIG. 1.

As shown in FIGS. 1 to 3, the lock mechanism 22 includes a holder 32, which is formed of a metal material having a bottom-equipped cylindrical shape, wherein a plurality of balls (retaining members) 36 are retained within ball holes 34 of the holder 32. The lock mechanism 22 further includes a displacement member (converting member) 38, which is displaceable in the axial direction, disposed on an outer circumferential side of the holder 32, an elastic member 40 arranged between the outer circumferential surface of the displacement member 38 and the inner circumferential surface of the installation hole 30, and a fastening ring 42, which engages in the vicinity of an opening of the installation hole 30, and which restricts engagement/disengagement of the holder 32.

Figure 4:
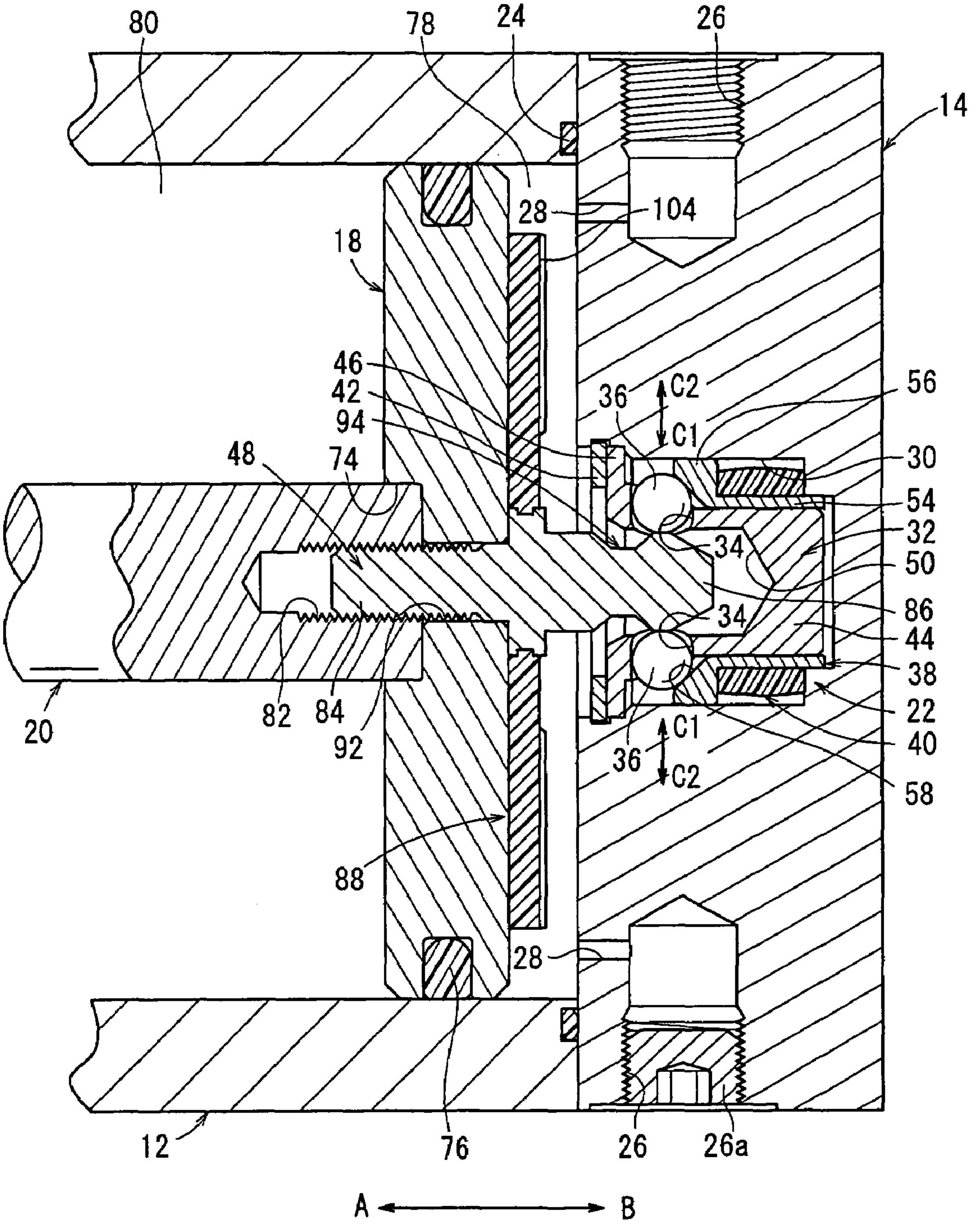
FIG. 4 is a magnified longitudinal sectional view illustrating a state in which the piston rod shown in FIG. 3 is further displaced toward the lock mechanism, and wherein a forward end of a lock pin is inserted into a holder.
Figure 5:
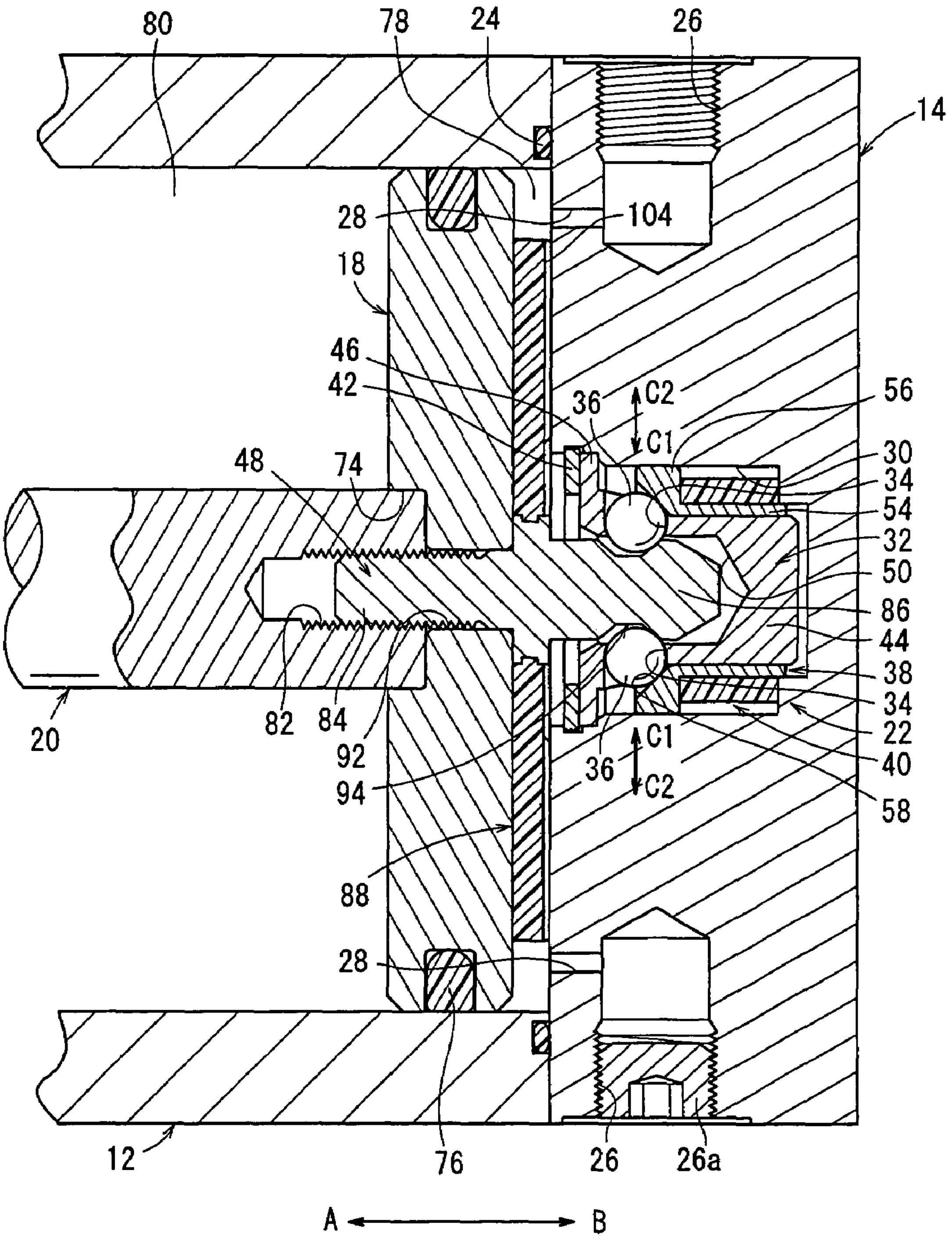
FIG. 5 is a magnified longitudinal sectional view illustrating the locked state, in which the piston rod is locked by the lock mechanism shown in FIG. 4.

As shown in FIGS. 3 to 5, the holder 32 is composed of a body section 44, a flange section 46 that expands diametrally at the end of the body section 44, and which is arranged on the side of the opening of the installation hole 30, and a plurality of ball holes 34, which are formed at boundary portions between the body section 44 and the flange section 46 along the circumferential surface of the body section 44. A pin hole 50, into which a lock pin 48 connected to the piston rod 20 is inserted, is formed in the body section 44. The inner circumferential diameter of the pin hole 50 is formed to be slightly larger than the outer circumferential diameter of the lock pin 48 (see FIG. 5).

The flange section 46 engages with a stepped section 52 (see FIG. 3), which is formed in the vicinity of the opening of the installation hole 30. Further, the fastening ring 42 engages with an annular groove, which is formed on a side nearer to the opening as compared with the stepped section 52. Accordingly, the flange section 46 of the holder 32 is fastened by the fastening ring 42, which is installed in the annular groove protruding in a radially inward direction. Therefore, the holder 32 cannot become disengaged from the installation hole 30. In other words, displacement of the flange section 46 in the axial direction is restricted within the installation hole 30 by the stepped section 52 and the fastening ring 42.

A plurality of (for example, four) ball holes 34 are provided in the body section 44, wherein the ball holes 34 are separated from each other by equal spacing distances along a circumferential surface of the body section 44 (see FIG. 2). The ball holes 34 disposed on the inner circumferential side of the holder 32 (in the direction of arrow C1) have diameters that are gradually reduced toward the inner circumferential side of the body section 44. Further, the ball holes 34 disposed on the outer circumferential side of the holder 32 (in the direction of arrow C2) have diameters that are formed so as to be substantially equivalent to the diameters of balls 36 inserted into the ball holes 34.

That is, the balls 36 are displaceable within the ball holes 34 by predetermined amounts in a radially inward direction (direction of arrow C1) of the body section 44. The balls 36 are retained so that parts of the balls 36 protrude from the ball holes 34 in the radially inward direction of the body section 44 (see FIG. 3). Conversely, owing to the configuration of the ball holes 34, the balls 36 are displaceable in a radially outward direction (direction of arrow C2) with respect to the body section 44. The balls 36 are arranged in the holder 32 such that the balls 36 are opposed to each other about the central axis of the holder 32.

The displacement member 38 is formed of a metal material. The displacement member 38 includes a cylindrical section 54, which slides while abutting against an outer circumferential surface of the body section 44 of the holder 32, and a diametrally expanded section 56, which is formed with an expanded diameter at an end of the cylindrical section 54. An inclined surface 58, having a diameter that is gradually reduced toward the cylindrical section 54 (in the direction of arrow B), is provided on an inner circumferential side of the diametrally expanded section 56. The balls 36, which are retained in the holder 32, abut against the inclined surface 58. More specifically, a state is provided in which outer circumferential surfaces of the balls 36 always abut against the inclined surface 58 of the displacement member 38.

As shown in FIG. 3, the angle of inclination $\theta 1$ of the inclined surface 58 is set to be about 45° with respect to the axis L of the displacement member 38 ($\theta 1 \approx 45°$). Accordingly, the inclined surface 58 reliably and appropriately abuts against the plurality of balls 36, whereby it is possible to press the balls 36 in a radially inward direction (direction of arrow C1).

The elastic member 40 is formed in a cylindrical shape from, for example, an elastic material such as urethane. The elastic member 40 exerts a resilient force in an axial direction (direction of arrow A). The elastic member 40 is arranged such that the inner circumferential surface of the elastic member 40 abuts against the outer circumferential surface of the cylindrical section 54 of the displacement member 38. Further, the outer circumferential surface of the elastic member 40 is separated a predetermined distance from the inner circumferential surface of the installation hole 30.

One end of the elastic member 40 abuts against the bottom portion of the installation hole 30, and the other end thereof abuts continuously against the diametrally expanded section 56 of the displacement member 38. That is, the resilient force of the elastic member 40 presses and urges the displacement member 38 toward the cylinder tube 12 (in the direction of arrow A).

Accordingly, the displacement member 38 is urged by the exerted pressing force toward the cylinder tube 12 (in the direction of arrow A), whereby the displacement member 38 is displaced by the pressing force toward the cylinder tube 12. Accordingly, the balls 36 are always urged in a radially inward direction (direction of arrow C1) by the inclined surface 58. As for the elastic member 40, for example, a coil spring or the like may be adopted in place of the urethane member. That is, it is sufficient for the elastic member 40 to have a resilient force capable of pressing the displacement member 38 toward the cylinder tube 12 (in the direction of arrow A), insofar as the elastic member 40 functions as an urging section for urging the displacement member 38 in the axial direction.

As shown in FIG. 1, the rod cover 16 is arranged at a position such that the rod cover 16 opposes the head cover 14 with the cylinder tube 12 intervening therebetween. A rod hole 60, into which the piston rod 20 is inserted, is formed at a substantially central portion of the rod cover 16. An annular bush 62 is installed in an inner circumferential surface of the rod hole 60 on the side of the cylinder tube 12 (in the direction of arrow B). A rod packing 64 is installed while being separated from the bush 62 by a predetermined distance. The piston rod 20 is appropriately supported by the bush 62 along the axial direction, while preserving the ability for linear motion thereof. The rod packing 64 acts to retain air tightness in the cylinder tube 12. Further, the interior of the cylinder tube 12 is prevented from invasion of dust or the like that may adhere to the rod packing 64.

Ends of a plurality of bolts 66, which are inserted into the head cover 14 and the cylinder tube 12, also are inserted into the rod cover 16. Nuts 68 are screw-engaged with the bolts 66 from the end surface side of the rod cover 16, whereby the rod cover 16 is fastened in an integrated manner.

Second ports (supply ports) 70 are formed in the rod cover 16, to which pressure fluid is supplied from an unillustrated pressure fluid supply source. The second ports 70 are provided in a pair on both side surfaces, which are symmetrical in relation to the central axis of the rod cover 16. The second ports 70 communicate with the interior of the cylinder tube 12 via second communication passages 72, which extend from bottom portions of the second ports 70 in the axial direction of the rod cover 16 (direction of arrow B). Either one of the pair of second ports 70 may be selected and used depending on, for example, the manner and environment of use of the cylinder apparatus 10, whereas the other of the second ports 70 is closed by a plug 70*a*.

One end of the piston rod 20 engages with a recess 74 disposed at a substantially central portion of the piston 18 from one side of the rod cover 16. The piston 18 is fixed to the piston rod 20 by the aid of a lock pin 48.

A piston packing 76 is installed in an annular groove disposed on the outer side surface of the piston 18. The piston packing 76 abuts against the inner wall surface of the cylinder tube 12. Accordingly, the piston packing 76 is subjected to sliding displacement in accordance with displacement of the piston 18, while air tightness is retained within the cylinder tube 12.

That is, a first cylinder chamber 78, which is closed by the piston 18 and the head cover 14, and a second cylinder chamber 80, which is closed by the piston 18 and the rod cover 16, are formed in the cylinder tube 12. Accordingly, the first cylinder chamber 78 communicates with the first port 26 via the first communication passage 28, and the second cylinder chamber 80 communicates with the second port 70 via the second communication passage 72.

The lock pin 48 is formed of, for example, carbon steel to which a hardening treatment is applied. As shown in FIGS. 3 to 5, the lock pin 48 includes a screw section 84 formed on one end side thereof, which is screw-engaged with a screw hole 82 of the piston rod 20, and a fastening section 86 formed at the other end of the lock pin 48, which is inserted into the holder 32 installed in the head cover 14. A damper flange 90, on which a damper plate 88 is installed, is formed between the screw section 84 and the fastening section 86.

The screw section 84 is inserted into a through-hole 92, which is formed in a substantially central portion of the piston 18, and then is screw-engaged with the screw hole 82 of the piston rod 20. Accordingly, the piston 18 is interposed between the damper flange 90 of the lock pin 48 and the end of the piston rod 20. Thus, the piston 18 is integrally connected to the piston rod 20 by the lock pin 48.

The fastening section 86 is formed with a columnar shape having a substantially constant diameter. An annular ball groove 94, which has a reduced diameter, is formed at a substantially central portion thereof in the axial direction. As shown in FIG. 3, the ball groove 94 is composed of a flat surface section 96 having a substantially planar cross section and a pair of inclined sections 98*a*, 98*b*, which are disposed adjacent to the flat surface section 96 and inclined by predetermined angles so that the diameters of the inclined sections 98*a*, 98*b* gradually expand from the flat surface section 96. The inclined sections 98*a*, 98*b* are formed respectively on a forward end of the fastening section 86 (in the direction of arrow B) as well as on the side of the damper flange 90 (in the direction of arrow A).

As shown in FIG. 3, the angle of inclination $\theta 2$ of the inclined section 98*a* is set to be within a range of 30° to 60° with respect to the axis L of the lock pin 48 ($30° \leqq \theta 2 \leqq 60°$). More preferably, an optimum angle of inclination $\theta 2$ of the inclined section 98*a* is set to be within a range of 40° to 50° ($40° \leqq \theta 2 \leqq 50°$). Accordingly, when the plurality of balls 36 engage with the ball groove 94 by the aid of the inclined section 98*a*, the lock pin 48 is retained appropriately and reliably by a pressing force exerted from the balls 36 in a radially inward direction (direction of arrow C1).

The forward end of the fastening section 86 is formed with a tapered shape, with a diameter gradually reduced toward the pin hole 50 of the holder 32. When the lock pin 48 is inserted into the pin hole 50 of the holder 32, the 25 ball groove 94 opposes the balls 36 retained by the holder 32 at that position.

A damper groove 100, which is recessed in a radially inward direction, is formed on the damper flange 90. The damper flange 90 is inserted into a hole 88*a* provided in the damper plate 88, whereby a projection 102 of the damper plate 88 engages with the damper groove 100. Accordingly, the damper plate 88 is retained on the lock pin 48, and displacement thereof in the axial direction is restricted. The damper plate 88 is formed of an elastic material (for example, urethane or rubber) with a plate-shaped form. One side surface of the damper plate 88 abuts against the side surface of the piston 18, whereas the other side surface thereof abuts against an end surface of the head cover 14 at a terminal end position at which the piston 18 is displaced toward the side of the head cover 14 (in the direction of arrow B) (see FIG. 1).

As described above, the piston 18 does not make direct contact with the head cover 14 at its displacement terminal end position. Any impact exerted on the piston 18 is buffered by the damper plate 88, which is composed of an elastic material. That is, the damper plate 88 is provided in order to buffer impacts, and in particular, the damper plate 88 is capable of buffering impacts exerted on the piston 18.

As shown in FIG. 2, the damper plate 88 includes relief grooves 104, which are recessed by a predetermined depth, and which are formed on the other side surface so as to be capable of making abutment against the head cover 14. The relief grooves 104 extend in a substantially cross-shaped form, so that the relief grooves 104 are perpendicular to one another in relation to the center of the hole 88*a*. As a result of the relief grooves 104 provided as described above, the entire end surface of the damper plate 88 does not make tight contact when the damper plate 88 abuts against the head cover 14. Rather, a state is given in which portions of the relief grooves 104 are separated from the head cover 14, and therefore, when the piston 18 is displaced in a direction (direction of arrow A) to separate from the head cover 14, the elastic material damper plate 88 can reliably and appropriately be separated from the head cover 14.

Further, the outer side surface of the damper plate 88 is formed to be smaller than the outer side surface of the piston 18. Therefore, the outer side surface of the damper plate 88 does not contact the inner wall surface of the cylinder tube 12. Further, when the damper plate 88 abuts against the end surface of the head cover 14, the first pair of communication passages 28, which open on the end surface, are not closed by the damper plate 88.

The cylinder apparatus 10, to which the lock mechanism 22 according to an embodiment of the present invention is applied, is basically constructed as described above. Next, operations, functions and effects of the cylinder apparatus 10 and the lock mechanism 22 shall be explained. Explanations shall be made assuming that an initial position resides in a state in which the piston 18 is displaced toward the rod cover 16 (in the direction of arrow A). In this situation, displacement of the piston 18 is not restricted by the lock mechanism 22, and therefore, the piston 18 is freely displaceable.

At first, when pressure fluid is supplied from an unillustrated pressure fluid supply source to the second port 70, the pressure fluid is introduced from the second port 70 and into the second cylinder chamber 80 via the second communication passage 72. The piston 18 is displaced toward the head cover 14 (in the direction of arrow B) under a pressing action by the pressure fluid. Further, the piston rod 20 and the lock pin 48, which are connected to the piston 18, are displaced in an integrated manner. In this situation, the first port 26 is open to atmospheric air.

As shown in FIG. 3, by displacement of the piston 18, the lock pin 48 is displaced in the direction of arrow B toward the pin hole 50 of the holder 32. The forward end of the lock pin 48 is inserted into the pin hole 50, and is further displaced while abutting against the balls 36 (see FIG. 4). The forward end of the lock pin 48 is formed in a tapered shape. Therefore, displacement is caused while the forward end gradually presses the balls 36 in a radially outward direction (direction of arrow C2). The pressed balls 36 are displaced in a radially outward direction (direction of arrow C2) along the ball holes 34.

As a result, the displacement member 38, which abuts against outer circumferential surfaces of the balls 36, is pressed via the inclined surface 58 in a direction to separate away from the cylinder tube 12 (in the direction of arrow B). The displacement member 38 is displaced to separate from the cylinder tube 12 (in the direction of arrow B) against a resilient force of the elastic member 40. In this situation, the elastic member 40 is shrunk and retracted in an axial direction under the pressing action effected by the displacement member 38. The elastic member 40 is expanded diametrally so that the elastic member 40 expands in a radially outward direction. The outer circumferential portion of the elastic member 40 is accommodated within the gap between the elastic member 40 and the installation hole 30 (see FIG. 4).

As shown in FIG. 5, the lock pin 48 is further displaced by the piston 18 toward the head cover 14 (in the direction of arrow B) under the pressing action by the pressure fluid. When the damper plate 88 abuts against the end surface of the head cover 14, a displacement terminal end position is provided. In this situation, any impact exerted when the piston 18 abuts against the head cover 14 is buffered by the damper plate 88.

On the other hand, when the piston 18 arrives at its displacement terminal end position, the ball groove 94 of the lock pin 48, which is inserted into the holder 32, is placed at a position where the ball groove 94 is opposed to the plurality of balls 36. In relation to the balls 36, the displacement member 38 is pressed toward the cylinder tube 12 (in the direction of arrow A) under a resilient action exerted by the retracted elastic member 40. Therefore, the balls 36 are pushed and returned again in a radially inward direction (direction of arrow C1) due to the inclined surface 58, under a displacement action of the displacement member 38. In particular, the balls 36 are pressed in a radially inward direction along the ball holes 34 due to the inclined surface 58 of the diametrally expanded section 56 of the displacement member 38. The balls 36 are displaced toward the flat surface section 96 along the inclined section 98*a* of the ball groove 94, so that the balls 36 engage with both the flat surface section 96 and the inclined section 98*a*.

Accordingly, portions of the balls 36 protrude on the inner circumferential side of the holder 32 via the ball holes 34 (in the direction of arrow C1), and respectively engage with the ball groove 94 of the lock pin 48. Therefore, displacement in the axial direction is restricted under the engaging action of the balls 36 with respect to the lock pin 48. That is, the magnitude of the pressing force imposed on the balls 36 toward the lock pin 48 is substantially equivalent to the magnitude of the resilient force of the elastic member 40, which is transmitted to the balls 36 via the displacement member 38. The retaining force exerted on the lock pin 48 by the balls 36 has a magnitude approximately equivalent to that of the resilient force of the elastic member 40. As a result, a locked state is given, in which the piston 18 and the piston rod 20 connected to the lock pin 48 are restricted from displacement in the axial direction by the lock mechanism 22 (see FIG. 5).

In this arrangement, the displacement member 38 converts the resilient force exerted by the elastic member 40 in the axial direction (direction of arrow A) into a force in the radial direction, substantially perpendicular to the axis, wherein such force is transmitted to the balls 36 as a pressing force in a radially inward direction (direction of arrow C1). In other words, the displacement member 38 functions as a converting mechanism, which transmits force from the elastic member 40 to the balls 36, while converting the urging direction of the pressing force.

Next, an explanation shall be given concerning a procedure for releasing the locked state of the piston 18 and the piston rod 20, which have been restricted from displacement by the lock mechanism 22.

At first, when pressure fluid having been supplied from an unillustrated pressure fluid supply source to the second port 70, is switched and supplied to the first port 26, under a switching action effected, for example, by an unillustrated directional control valve, the pressure fluid is introduced from the first port 26 into the first cylinder chamber 78 via the first communication passage 28. In this situation, the second port 70 is open to atmospheric air.

A pressing force is applied to the piston 18 under a pressing action by the pressure fluid, which is directed to cause the piston 18 to separate from the head cover 14 (in the direction of arrow A). The piston 18 is displaced toward the rod cover 16. Further, the lock pin 48, which is connected to the piston 18, is displaced in the axial direction while overcoming the pressing force exerted in the radially inward direction (direction of arrow C1) from the balls 36 via the ball groove 94. Therefore, in this situation, the balls 36 are forcibly pressed in a radially outward direction (direction of arrow C2), through the aid of the inclined section 98*a*, so as to separate away from the flat surface section 96 of the ball groove 94 under the displacement action of the lock pin 48. Therefore, a locked state, which is based on engagement of the balls 36 with respect to the lock pin 48, is released. An unlocked state is given, in which the lock pin 48 is made freely displaceable in the axial direction.

When pressure fluid is further supplied to the first cylinder chamber 78, the lock pin 48 disengages from the pin hole 50 of the holder 32, and the piston 18 is displaced toward the rod cover 16 (in the direction of arrow B) integrally with the lock pin 48 and the piston rod 20.

As described above, in the embodiment of the present invention, the lock mechanism 22 is disposed in the installation hole 30 at a substantially central portion of the head cover 14. Plural balls 36 are provided in the lock mechanism 22, so that the balls 36 are displaceable in radial directions (in the directions of arrows C1, C2) with respect to the ball holes 34 of the holder 32. Further, the displacement member 38, which is displaceable in an axial direction by means of the resilient force of the elastic member 40, is disposed on an outer circumferential side of the holder 32.

Accordingly, when the lock pin 48 connected to the piston 18 is inserted into the holder 32, the balls 36 are displaced in a radially outward direction (direction of arrow C2) while overcoming the resilient force of the elastic member 40. When the ball groove 94 of the lock pin 48 is displaced to a position opposed to the balls 36, then the balls 36 are pressed again in a radially inward direction (direction of arrow C1) by the resilient force of the elastic member 40 acting on the displacement member 38, wherein the balls 36 engage within the ball groove 94.

As a result, the plurality of balls 36 engage with the lock pin 48 through the ball groove 94, whereby it is possible to restrict displacement of the piston 18 in the axial direction (direction of arrow A). In this arrangement, the pressing force exerted on the balls 36 in the radially inward direction has a magnitude which is substantially equivalent to that of the resilient force of the elastic member 40. In other words, the pressing force exerted by the balls 36 on the lock pin 48, can be increased or decreased by changing the magnitude of the resilient force of the elastic member 40. Therefore, the retaining force for the lock pin 48 in the lock mechanism 22 can be adjusted in accordance therewith.

The lock pin 48, the balls 36 that engage with the lock pin 48, the holder 32 for retaining the balls 36, and the displacement member 38, all of which constitute elements of the lock mechanism 22, are formed from metal materials. Therefore, when the lock pin 48 is retained by the balls 36, it is possible to suppress abrasion caused by contact between the respective members. Therefore, durability can be improved, as compared with the conventional lock mechanism, in which a locking operation is performed by a buffer composed of an elastic material.

Since abrasion of the constitutive elements making up the lock mechanism 22 is suppressed, the retaining force exerted on the lock pin 48 is not lowered due to such abrasion, even after a lapse of time of several years. Thus, it is possible to obtain a substantially constant retaining force, which remains stable for many years.

Since abrasion of the lock mechanism 22 is suppressed, it is possible to prolong the maintenance cycle of the respective elements that make up the lock mechanism 22. Accordingly, it is possible to reduce complicated maintenance operations.

Although certain preferred embodiments of the present invention have been shown and described in detail, it should be understood that various changes and modifications may be made therein without departing from the scope of the appended claims.

What is claimed is:

1. A lock mechanism for restricting displacement of a piston, usable in a fluid pressure-operated apparatus comprising:

a cylinder body to which a pressure fluid is supplied via a supply port, and wherein said piston is displaceable in an axial direction in said cylinder body under a pressing action effected by said pressure fluid, said lock mechanism comprising:

a fastening section provided integrally with said piston, which protrudes on one end side of said cylinder body in a displacement direction of said piston, and which includes an annular groove disposed along an outer circumferential surface thereof;

a retaining section disposed in said cylinder body, into which said fastening section is inserted, and which comprises a retaining member that is displaceable in a direction substantially perpendicular to an axis of said fastening section; and an urging section disposed in an installation hole at one end of said cylinder body for urging said retaining member toward said fastening section, said urging section comprising an elastic member made of an elastic material that exerts a resilient force in said axial direction of said cylinder body, and a converting member, which is displaceable in said axial direction by said resilient force of said elastic member, and which converts an urging direction of said resilient force into a direction that is substantially perpendicular to said axis, so that said force is transmitted to said retaining member, said elastic member being disposed between an outer circumferential surface of said converting member and an inner circumferential surface of said installation hole, wherein said retaining member is displaced toward said fastening section under an urging action effected by said urging section, and said retaining member engages with said annular groove when said fastening section is inserted into said retaining section and said annular groove is opposed to said retaining member.

2. The lock mechanism according to claim 1, wherein said retaining section comprises:

a holder disposed in a head cover connected to an end of a cylinder tube; and a plurality of retaining members, which are displaceable through holes of said holder.

3. The lock mechanism according to claim 2, wherein said retaining member comprises a ball.

4. The lock mechanism according to claim 1, wherein said converting meter includes an inclined surface, which is inclined by a predetermined angle with respect to said axis of said converting member, and which opposes and abuts against said retaining member.

5. The lock mechanism according to claim 4, wherein an angle of inclination of said inclined surface is set at 45° with respect to said axis of said converting member.

6. The lock mechanism according to claim 5, wherein said converting member is displaced under a resilient action of said elastic member, and said retaining member is pressed toward said fastening section by said inclined surface.

7. The lock mechanism according to claim 5, wherein said inclined surface is pressed by said retaining member, and said converting member is displaced toward said elastic member, when said retaining member is displaced under a pressing action effected by said fastening section.

8. The lock mechanism according to claim 1, wherein said annular groove comprises:

a flat surface section formed substantially in parallel to said axis of said fastening section; and a pair of inclined sections adjacent to said flat surface section, which are inclined respectively so that diameters thereof expand gradually toward said retaining section and said piston.

9. The lock mechanism according to claim 8, wherein an angle of inclination of said inclined section is set to be within a range of 30° to 60° with respect to said axis of said fastening section.

10. The lock mechanism according to claim 8, wherein an angle of inclination of said inclined section is set to be within a range of 40° to 50° with respect to said axis of said fastening section.

11. The lock mechanism according to claim 1, wherein an end of said fastening section is formed with a tapered shape having a diameter which is gradually reduced toward said retaining section.

12. The lock mechanism according to claim 1, wherein said elastic material is urethane.

13. The lock mechanism according to claim 1, wherein, when said converting member is displaced to separate from said cylinder body, said elastic member is expanded diametrally such that the elastic member expands in a radially outward direction.

* * * * *